United States Patent [19]

Miyamoto et al.

[11] Patent Number: 4,620,197

[45] Date of Patent: Oct. 28, 1986

[54] INK JET RECORDING METHOD

[75] Inventors: Shigehiko Miyamoto, Kamagaya; Yoshinobu Watanabe, Matsudo; Yuriko Kishi, Misato, all of Japan

[73] Assignee: Mitsubishi Paper Mills, Ltd., Tokyo, Japan

[21] Appl. No.: 532,512

[22] Filed: Sep. 15, 1983

[30] Foreign Application Priority Data

Sep. 17, 1982 [JP] Japan ................................. 57-163032

[51] Int. Cl.[4] ........................ G01D 15/16; B05D 5/00; B32B 7/00; C09D 11/00
[52] U.S. Cl. ................................... 346/1.1; 346/135.1; 427/214; 427/288; 428/206; 428/207; 428/211; 428/331; 106/20; 106/22
[58] Field of Search .............................. 346/135.1, 1.1; 427/288, 214; 428/207, 331, 206, 211; 106/20, 22; 252/301.23

[56] References Cited

U.S. PATENT DOCUMENTS 4,374,643  2/1983  Suzuki et al. ........................ 8/648 X
4,425,405  1/1984  Murakami et al. ............. 428/342 X
4,446,174  5/1984  Maekawa et al. ................... 427/261

Primary Examiner—E. A. Goldberg
Assistant Examiner—Gerald E. Preston
Attorney, Agent, or Firm—Cushman, Darby & Cushman

[57] ABSTRACT

By allowing at least the surface of an ink jet recording sheet to contain a cationic fluorescent agent, the waterproofness of water-soluble dyes in inks as well as the brightness of the recording sheet can be enhanced and thereby multicolor images of excellent color reproducibility can be formed on the sheet.

4 Claims, No Drawings

INK JET RECORDING METHOD

BACKGROUND OF THE INVENTION

1. FIELD OF THE INVENTION

This invention relates to an ink jet recording method and particularly to an ink jet recording method giving high density images and letters, distinct colors, fast ink absorption and low ink feathering or blotting and suitable for multicolor recording

2. DESCRIPTION OF THE PRIOR ART

In recent years, the ink jet recording method has rapidly come into wide use in many applications such as hard copy equipments for various figures including Chinese characters, color images, etc., because of its several advantages such as high speed, low noise, easy production of multicolor, capability of recording a wide variety of patterns and no need of development and fixation. Further, because the multicolor ink jet recording method provides images about equal in quality to those of the ordinary color printing method and, when a small number of image copies is produced, this method provides a lower cost compared with the conventional printing plate process, the ink jet recording method is being tried even in fields of multicolor printing and of the printing of color photograph Plain paper or coated paper used in ordinary printing, and so-called baryta paper used as a base paper for photographic printing paper are very poor in ink absorption. Accordingly, when these papers are used for ink jet recording, inks remain on their surfaces for a long time. Therefore, if recorded surfaces are rubbed by contact of part of the equipment or by an operator or by overlapping of sheets continuously discharged, images are stained with remaining inks. Further, at high density image portions or at locations in multicolor recording where ink dots of two to four colors are piled up, inks are not sufficiently absorbed because of high total ink volume resulting in coming of inks or flowing of inks. Hence, these papers are not practical for ink jet recording.

Ink jet recording sheets are necessary to have all the following requirements; that is, (1) recorded images have a high optical density and color reproduction, and inks are quickly absorbed and do not flow, (2) there occurs no staining even if images are touched right after printing, and (3) lateral diffusion of ink dots on recording sheets is suppressed and thereby images of high resolution power with no feathering can be obtained.

In order to satisfy these requirements, various proposals have been hitherto made. For example, Japanese Laid-Open Patent Publication No. 53012/1977 discloses an ink jet recording sheet obtained by wetting the surface of a base paper of low sizing with a coating for surface processing. Japanese Laid-Open Patent Publication No. 49113/1978 discloses an ink jet recording sheet obtained by impregnating a sheet containing an urea-formalin resin powder with a water-soluble high molecular substance. Japanese Laid-Open Patent Publication No. 5830/1980 discloses an ink jet recording sheet obtained by providing an ink-absorbing coating layer on the surface of a support. Japanese Laid-Open Patent Publication No. 51583/1980 discloses an ink jet recording sheet using a non-colloidal pigment in its covering layer. Japanese Laid-Open Patent Publication No. 146786/1980 discloses an ink jet recording sheet having a coating layer of a water-soluble high molecular substance. Japanese Laid-Open Patent Publication No. 11829/1980 discloses a method in which an ink jet recording sheet is made so as to have at least two layers and the outermost layer is made so as to have an ink absorption rate of 1.5 to 5.5 mm/min and the second layer is made so as to have an ink absorption rate of 5.5 to 60.0 mm/min and thereby spreading of ink dots and ink absorption rate are controlled.

However, the technical concept as represented by Japanese Laid-Open Patent Publication No. 58012/1977 aims at a high resolution power with slight sacrifice of ink absorption, and the technical concept as represented by Japanese Laid-Open Patent Publication No. 49113/1978 assures ink absorption and resolution power to some extent but is difficult to give an intended ink density because the ink penetrates deep into the recording sheet. Thus, both concepts are dissatisfactory for multicolor ink jet recording sheets.

As methods for improving these drawbacks, Japanese Laid-Open Patent Publication No. 51583/1980 discloses an ink jet recording sheet coated with a non-colloidal silica powder, and Japanese Patent Publication No. 790/1978 discloses an optical bar code printing paper, coated with a fine silicic acid powder.

By providing such a layer of synthetic silica or other white fine powder on the surface of an ink jet recording sheet, the sheet can be greatly improved in resolution power, color tone, color density, ink absorption, dot circularity, etc. However, these recording media often use water-base inks and therefore, when images formed on the recording media are exposed to water or the like, the inks dissolve out into the water or the like; hence, these recording media were still dissatisfactory for outdoor applications like posters or photographic applications where image retention is an important requirement.

Further, when recording media are used for multicolor images, the whiteness of the media itself is used as a white color and therefore further improvement of the whiteness to our eyes is desirable. Simultaneous solution of all these problems had been desired.

To solve these problems, various proposals have been hitherto made. For example, Japanese Laid-Open Patent Publication No. 53591/1980 discloses a recording sheet in which a water-soluble salt of a metal is attached to the sheet surface where recording is made. Japanese Laid-Open Patent Publication No. 84992/1981 discloses an ink jet recording method in which printing is made on a recording medium containing at its surface a polycationic high molecular electrolyte, with a water-base ink containing a water-soluble substantive dye or acid dye. Japanese Laid-Open Patent Publication No. 150396/1980 discloses a method of providing waterproof ink jet records which comprises conducting ink jet recording with a water-base ink and then applying a water proofness-imparting agent which reacts with a dye in said water-base ink to form a lake. Further, Japanese Laid-Open Patent Publication No. 58869/1981 discloses a method of making ink jet-recorded sheets waterproof which comprises conducting ink jet recording on an ink jet recording sheet coated with a water-soluble high molecular substance with a water-base ink and then applying a waterproofness-imparting agent which insolubilizes said water-soluble high molecular substance.

These techniques for providing water proofness to recorded images formed with water-base inks greatly reduce the effect of fluorescent agents conventionally used in the paper manufacturing industry as a brightening agent. Therefore, aiming at both waterproofness of water-base ink images and improvement of fluorescent brightness has resulted in increased process steps, necessity of increasing quantities of waterproofness-imparting agents and fluorescent agents for sufficiently recovering their reduced effects, or, in some cases, incomplete recovery of their reduced effects even after their quantity increases.

SUMMARY OF THE INVENTION

In order to obtain an ink jet recording method capable of providing water-base ink images of good waterproofness and color reproduction, the present inventors made extensive studies on water-proofness-imparting agents and fluorescent brightening agents. As a result, it has been found out that, by allowing at least the surface of an ink jet recording sheet to contain a cationic fluorescent agent, a water-soluble dye in an ink is made waterproof and the brightening effect of the recording sheet to our eyes is increased and thereby multicolor images of excellent color reproducibility can be formed on the sheet. Based on this finding, this invention has been completed.

This invention relates to an ink jet recording method which comprises printing, on an ink jet recording sheet at least the surface of which contains a cationic fluorescent agent, water-base inks containing at least either of a water-soluble substantive dye and a water-soluble acid dye.

DETAILED DESCRIPTION OF THE INVENTION

It had been conventionally known that waterproofness of ink jet-recorded images is enhanced by allowing ink jet recording sheets to contain a mordant such as a dicyandiamide condensate, a polyamine, a polyethyleneimine or the like. However, these mordants, when used together with an anionic fluorescent brightening agent ordinarily employed in the paper industry, greatly deteriorate the brightening effect of the latter and, in some cases, nullify the effect or cause yellowing. When used in the same bath, a fluorescent brightening agent and a mordant react to cause precipitation, insolubilization or formation of a sticky rubber-like substance. Hence, combined use of these two compounds particularly in a single liquid had been impossible.

As a result of extensive studies, the present inventors have found out that, when an ink jet recording sheet contains a cationic fluorescent agent, a water-soluble dye in an ink is made waterproof and simultaneously the brightening effect of the recording sheet is increased.

According to this invention, when ink jet recording is made on an ink jet recording sheet containing a cationic fluorescent agent, with water-base inks containing a substantive dye or acid dye having an anionic dissociation group, the dyes in the water-base inks and the cationic fluorescent agent in the recording sheet combine whereby dissolving-out of the dye is prevented.

Further, the present inventors have found out that, by using a cationic resin together with a cationic fluorescent agent, brightness, water-proofness, etc. can be further improved The reason why the waterproofness of a water-soluble substantive dye or acid dye is improved when recording is made on a recording sheet containing a cationic fluorescent agent with water-base inks containing said dye, is presumed to be that said dye containing an anionic dissociation group in its molecule forms an ionic bond with the cationic fluorescent agent in the recording sheet whereby the dye is insolubilized and its dissolution into water or the like is prevented.

As the cationic fluorescent agent usable in this invention, there can be mentioned aminocoumarin derivatives, coumarin derivatives, benzoimidazole derivatives, pyrazoline derivatives, etc. Of these, benzoimidazole derivatives are preferable for this invention, and Uvitex BAC and Uvitex RAC both of CIBA-GEIGY are particularly preferable. These cationic fluorescent agents can exhibit good fluorescent brightening effect and waterproofness-imparting effect by being present in the recording sheet in a quantity of 0.02 to 0.4 $g/m^2$ preferably 0.05 to 0.3 $g/m^2$.

Examples of the cationic resin usable in this invention include polyamines, polyethyleneimines, dicyandiamide condensates, polyamide-polyamine resins, polyamide-epichlorohydrin resins, polymers of quaternary ammonium salt type and so forth.

The content of the cationic resin is supposed to be naturally dependent on the content of the cationic fluorescent agent but is ordinarily 0 to 4 $g/m^2$ preferably 0.2 to 2 $g/m^2$.

Application of the cationic fluorescent agent and the cationic resin onto the recording sheet can be made by various methods. For example, the cationic fluorescent agent and the cationic resin are made into an aqueous solution; if necessary, this solution is mixed with a binder ordinarily used such as oxidized starch, a polyvinyl alcohol, a carboxymethyl cellulose, any other water-soluble cellulose derivative or the like; the resulting mixture is coated on a base paper by the use of a size press, a roll coater or any other type coater. Or, the above aqueous solution is coated on a so-called coated paper having a coating layer composed of (a) a pigment having a high absorption power for inks such as synthetic silica, synthetic alumina, calcium carbonate or like and (b) a binder, by the use of an air-knife coater, a roll coater, a blade coater, a spraying method or the like. Or, the above aqueous solution is added to a coating color comprising the above pigment and a binder and then a coating layer is formed therefrom. In such a way, a recording sheet at least the surface of which contains a cationic fluorescent agent can be produced.

In the meantime, water-base inks used in this invention contain at least either of a water-soluble substantive dye and a water-soluble acid dye and, besides, a wetting agent, a dye solubilizer, an antiseptic, an antifungus agent and so forth.

As the water-soluble substantive dye, there can be mentioned C.I Direct Black, C.I Direct Yellow, C.I Direct Blue, C.I Direct Red, etc. As the water-soluble acid dye, there can be used C.I Acid Black, C.I Acid Yellow, C.I Acid Blue, C.I Acid Red, C.l Acid Black, etc. Of course, other compounds can be used.

These dyes are given water solubility by groups present in their molecules such as $—SO_3Na$, $—SO_3H$, $—NH_2$ or the like. When an ink containing these dyes is printed on and absorbed by the aforementioned recording sheet, anionic groups of these dyes in the ink and the cationic fluorescent agent contained in the recording sheet form ionic bonds, whereby water-insoluble salts are formed and water-proofness of the image obtained is improved.

Hereinunder, this invention will be explained by referring to Examples but is in no way restricted by the Examples. Parts and % in the Examples refer to parts by weight and % by weight, respectively.

Physical properties of recording sheets appearing in the Examples were measured as follows.

(1) Water proofness

An image obtained by printing each ink of Cyan (C), Magenta (M), Yellow (Y) and Black (B) was exposed to natural drying for 1 hr. Then, the image was immersed in water of 30° C. for 3 min. Image densities before and after the immersion were measured by the use of a Macbeth Densitometer RD 514. The percentage of the image density after immersion to the image density before immersion was used as a yardstick for waterproofness. A higher value means better waterproofness.

(2) Resolution power

An ink drop of 100 μm diameter of a water-base ink (black) for ink jet use was allowed to adhere to the surface of a recording sheet. After the drop had been absorbed, the area occupied by the drop was measured. On the basis of an assumption that the area be a true circle, its diameter was calculated and this value (μm) was used as the resolution power of the ink. A smaller diameter means a better resolution power.

(3) Brightness improvement

Brightening effects of ink-jet recording sheets of the present invention under natural light were measured by visual evaluation and reported in either of six ratings of x, ▲, △, ⊚, ⊙, (x worst and best).

COMPARATIVE EXAMPLE 1

To a pulp slurry consisting of 80 parts of LBKP of 350 ml freeness and 20 parts of NBKP of 400 ml freeness, were added 25 parts of calcium carbonate PC (precipitated calcium carbonate manufactured by Shiraishi Kogyo Kaisha, Ltd.) as a filler and 1 part of Cato F (cationized starch manufactured by Oji-National Co.) as a retention aid and paper strength improver. The resulting mixture was passed through a Fourdrinier machine to produce a base paper of 60 g/m². To the base paper was attached MS 3800 (oxidized starch manufactured by Nihon Shokuhin Kako Co., Ltd.) with a size press so that MS 3800 became 2.4 g/m² as solid, whereby a recording sheet of Comparative Example 1 was obtained. This sheet was tested for ink jet properties and the results were shown in Table 1.

COMPARATIVE EXAMPLE 2

To the base paper used in Comparative Example 1 were attached with a size press 2.4 g/m² (as solid) of MS 3800 and 0.1 g/m² of Uvitex ERN (benzoxazole derivative, manufactured by CIBA-GEIGY) as a nonionic fluorescent brightening agent, whereby a recording sheet of Comparative Example 2 was obtained. This sheet was tested for ink jet properties and the results were shown in Table 1.

COMPARATIVE EXAMPLE 3

A recording sheet of Comparative Example 3 was obtained in the same manner as in Comparative Example 2, except that the fluorescent brightening agent used in Comparative Example 2 was replaced by Whitex BBCone (stilbene derivative, nonionic, manufactured by Sumitomo Chemical Co., Ltd.). This sheet was tested for ink jet properties and the results were shown in Table 1.

EXAMPLE 1

To the base paper used in Comparative Example 1 were attached with a size press 2.4 g/m² (as solid) of MS 3800 and 0.1 g/m² of Uvitex AT (benzoimidazole derivative, weakly cationic, manufactured by CIBA-GEIGY) as a cationic fluorescent brightening agent, whereby a recording sheet of Example 1 was obtained. This sheet was tested for ink jet properties and the results were shown in Table 1.

EXAMPLE 2

A recording sheet of Example 2 was obtained in the same manner as in Example 1, except that the fluorescent brightening agent used in Example 1 was replaced by Uvitex BAC (benzoimidazole derivative, cationic, manufactured by CIBA-GEIGY). This sheet was tested for ink jet properties and the results were shown in Table 1.

EXAMPLE 3

A recording sheet of Example 3 was obtained in the same manner as in Example 1, except that the fluorescent brightening agent used in Example 1 was replaced by Kayahor WN (coumarin derivative, cationic, manufactured by Nippon Kayaku Co., Ltd.). This sheet was tested for ink jet properties and the results were shown in Table 1.

EXAMPLE 4

A recording sheet of Example 4 was obtained in the same manner as in Example 1, except that the fluorescent brightening agent used in Example 1 was replaced by Uvitex WGS (aminocoumarin derivative, cationic, manufactured by CIBA-GEIGY). This sheet was tested for ink jet properties and the results were shown in Table 1.

TABLE 1

| Recording sheet | Waterproofness, % | | | | Resolution power μm | Brightness improvement |
| --- | --- | --- | --- | --- | --- | --- |
| | Magenta | Cyan | Yellow | Black | | |
| Comparative Example 1 | 32 | 65 | 11 | 61 | 301 | x |
| Comparative Example 2 | 35 | 69 | 10 | 66 | 305 | ▲ |
| Comparative Example 3 | 34 | 66 | 10 | 62 | 298 | ⊚ |
| Example 1 | 59 | 81 | 51 | 89 | 303 | ⊙ |
| Example 2 | 66 | 88 | 56 | 92 | 299 | ⊚ |
| Example 3 | 52 | 76 | 49 | 84 | 297 | △ |
| Example 4 | 53 | 75 | 44 | 80 | 300 | △ |

EXAMPLE 5

To a pulp slurry consisting of 75 parts of LBKP of 370 ml freeness and 25 parts of NBKP of 400 ml freeness, were added 18 parts of Kamitalc (paper making talc manufactured by Nippon Talc Co., Ltd.) as a filler and 0.8 part of Cato 2 (cationized starch manufactured by Oji-National Co.) as a retension aid paper strength improver. The resulting mixture was passed through a Fourdrinier machine to produce a base paper of 70 g/m². To this base paper were attached with size press 1.0 g/m² (as solid) of PVA 117 (polyvinyl alcohol manufactured by Kurare Co., Ltd.), 0.02 g/m² (as solid) of Uvitex BAC (cationic fluorescent agent manufactured by CIBA-GEIGY) and 0.8 g/m² (as solid) of Epomine P 1000 (polyethyleneimine manufactured by Nihon Shokubai Kagaku Kogyo Co., Ltd.), whereby a recording sheet of Example 5 was obtained. This sheet was tested for ink jet properties and the results were shown in Table 2.

EXAMPLE 6

To the base paper used in Example 5 were attached with a size press 1.0 g/m² (as solid) of PVA 117, 0.05 g/m² (as solid) of Uvitex BAC and 0.2 g/m² (as solid) of Chemistat 6200 (cationic resin manufactured by Sanyo Chemical Industries Co., Ltd.), whereby a recording sheet of Example 6 was obtained. This sheet was tested for ink jet properties and the results were shown in Table 2.

EXAMPLE 7

To the base paper used in Example 5 were attached with a size press 1.0 g/m² of PVA 117, 0.1 g/m² of Uvitex BAC and 0.6 g/m² of Nikafloc D 1000 (dicyandiamide condensate manufactured by Nippon Carbide Industries Co., Ltd.), whereby a recording sheet of Example 7 was obtained. This sheet was tested for ink jet properties and the results were shown in Table 2.

EXAMPLE 8

To the base paper used in Example 5 were attached with a size press 1.0 g/m² of PVA 117, 0.3 g/m² of Uvitex BAC and 3 g/m² of Polyfix 201 (polyamide-epichlorohydrin manufactured by Showa Highpolymer Co., Ltd.), whereby a recording sheet of Example 8 was obtained. This sheet was tested for ink jet properties and the results were shown in Table 2.

EXAMPLE 9

To the base paper used in Example 5 were attached with a size press 1.0 g/m² of PVA 117, 0.2 g/m² of Uvitex BAC and 2 g/m² of Sanfix 70 (dicyandiamide condensate manufactured by Sanyo Chemical Industries Co., Ltd.), whereby a recording sheet of Example 9 was obtained. This recording sheet was tested for ink jet properties and the results were shown in Table 2.

COMPARATIVE EXAMPLE 4

To the base paper used in Example 5 was attached 1.0 g/m² of PVA 117 in a size press, whereby a recording sheet of Comparative Example 4 was obtained.

These sheets were tested for ink jet properties and the results were shown in Table 2.

TABLE 2

| Recording sheet | Waterproofness, % | | | | Resolution power μm | Brightness improvement |
| --- | --- | --- | --- | --- | --- | --- |
| | Magenta | Cyan | Yellow | Black | | |
| Example 5 | 97 | 100 | 82 | 100 | 339 | Δ |
| Example 6 | 93 | 91 | 88 | 94 | 348 | Ⓐ |
| Example 7 | 100 | 100 | 96 | 98 | 350 | ○ |
| Example 8 | 90 | 95 | 78 | 94 | 332 | ⊚ |
| Example 9 | 100 | 100 | 97 | 99 | 345 | ⊚ |
| Comparative Example 4 | 36 | 62 | 9 | 65 | 356 | x |

As is obvious from Table 2, by the combined use of a cationic fluorescent resin with a cationic resin, waterproofness is further improved. Particularly by the combined use with a dicyandiamide condensate, waterproofness is elevated to near 100% in all four colors.

EXAMPLES 10 to 18

To a pulp slurry consisting of 90 parts of LBKP of 380 ml freeness and 10 parts of NBKP of 410 ml freeness were added 10 parts of talc, 0.3 part of a rosin sizing agent and 2.2 parts of alum. The resulting mixture was passed through a Fourdrinier machine to produce a paper. To the paper was attached oxidized starch with a size press so that the starch became 2.8 g/m² as solid, whereby a coated paper was produced. On this paper was coated, by the use of an air-knife coater, 13 g/m² (as solid) of a coating obtained by adding, to a pigment slurry comprising 80 parts of synthetic silica and 20 parts of ground limestone, 13 parts of a polyvinyl alcohol as an adhesive and, if necessary, a defoamant, a fluidity modifier, an antiseptic, a curing agent and so forth, so that the coated weight of the coating became 13 g/m², whereby a base sheet was produced. Separately, Uvitex BAC and Nikafloc D 1000 were dissolved in a 3% aqueous polyvinyl alcohol solution so that the former two substances gave coated weights as shown in Table 3, respectively, whereby a coating solution was produced. This coating solution was coated on the above base sheet by the use of an air-knife coater so that the coated weight became 1 g/m² as the solid content of the polyvinyl alcohol and then dried. Subsequently, the resulting paper was subjected to light duty supercalendering. In this way, recording sheets of Examples 10 to 18 were obtained. These sheets were tested for ink jet properties and their results were shown in Table 3.

COMPARATIVE EXAMPLE 5

On the base sheet used in Examples 10 to 18 was coated 1 g/m² (as solid) of a polyvinyl alcohol and dried. The resulting paper was subjected to light duty supercalendering, whereby a recording sheet of Comparative Example 5 was obtained.

These sheets were tested for ink jet properties and the results were shown in Table 3.

TABLE 3

| Recording sheet | Uvitex BAC g/m² | Nikafloc D1000 g/m² | Waterproofness, % | | | | Resolution power, μm | Brightness improvement |
| --- | --- | --- | --- | --- | --- | --- | --- | --- |
| | | | Magenta | Cyan | Yellow | Black | | |
| Example 10 | 0.1 | — | 56.3 | 68.2 | 61.0 | 85.3 | 221 | ○ |
| Example 11 | 0.2 | — | 60.5 | 71.3 | 65.8 | 88.8 | 225 | ⊚ |
| Example 12 | 0.3 | — | 62.5 | 76.2 | 68.2 | 90.0 | 220 | ⊚ |
| Example 13 | 0.4 | — | 65.8 | 78.8 | 70.3 | 90.5 | 220 | ⊚ |
| Example 14 | 0.15 | 0.3 | 100 | 99 | 92 | 96 | 231 | ⊚ |

TABLE 3-continued

| Recording sheet | Uvitex BAC g/m² | Nikafloc D1000 g/m² | Test item | | | | Resolution power, μm | Brightness improvement |
| --- | --- | --- | --- | --- | --- | --- | --- | --- |
| | | | Waterproofness, % | | | | | |
| | | | Magenta | Cyan | Yellow | Black | | |
| Example 15 | 0.15 | 0.6 | 100 | 100 | 95 | 98 | 225 | ◉ |
| Example 16 | 0.15 | 1.0 | 100 | 100 | 99 | 99 | 228 | ◉ |
| Example 17 | 0.15 | 2.0 | 100 | 100 | 100 | 100 | 221 | ◉ |
| Example 18 | 0.15 | 4.0 | 100 | 100 | 100 | 100 | 230 | ◉ |
| Comparative Example 5 | — | — | 10.1 | 23.3 | 13.4 | 72.1 | 222 | x |

As is obvious from Table 3, waterproofness is considerably improved by the use of a cationic fluorescent agent only but is very remarkably improved by its combined use with a cationic resin particularly a dicyandiamide condensate resin.

What is claimed is:

1. In an ink jet recording method which comprises coating an aqueous solution on a surface of a base paper and drying it to obtain a recording sheet and thereafter printing a water-base ink on the aqueous solution-coated surface of the recording sheet, the improvement comprising employing an aqueous solution which contains a cationic fluorescent agent and wherein said water-base ink contains either a water-soluble substantive dye or a water-soluble acid dye.

2. An ink jet recording method according to claim 1, wherein said cationic fluorescent agent is a benzoimidazole derivative.

3. An ink jet recording method according to claim 1 or 2, wherein said aqueous solution further contains a cationic resin.

4. An ink jet recording method according to claim 3 wherein the cationic resin is a dicyandiamide condensate.

* * * * *